(12) United States Patent
Heckmeier et al.

(10) Patent No.: US 6,514,580 B2
(45) Date of Patent: Feb. 4, 2003

(54) LIQUID-CRYSTALLINE MEDIUM

(75) Inventors: Michael Heckmeier, Bensheim (DE); Dagmar Klement, Münster (DE); Matthias Bremer, Darmstadt (DE)

(73) Assignee: Merck Patent Gesellschaft mit beschränkter Haftung, Darmstadt (DE)

( * ) Notice: Subject to any disclaimer, the term of this patent is extended or adjusted under 35 U.S.C. 154(b) by 146 days.

(21) Appl. No.: 09/730,728

(22) Filed: Dec. 7, 2000

(65) Prior Publication Data

US 2001/0010366 A1 Aug. 2, 2001

(30) Foreign Application Priority Data

Dec. 8, 1999 (DE) .......................... 199 59 033

(51) Int. Cl.$^7$ .................. C09K 19/30; C09K 19/12
(52) U.S. Cl. ............... 428/1.1; 252/299.63; 252/299.66
(58) Field of Search .............. 428/1.1; 252/299.63, 252/299.66

(56) References Cited

U.S. PATENT DOCUMENTS 6,348,244 B1 * 2/2002 Miyazawa et al. ........... 428/1.1
6,376,030 B1 * 4/2002 Heckmeier et al. .......... 428/1.1

FOREIGN PATENT DOCUMENTS

DE          3807872      * 9/1989

* cited by examiner

*Primary Examiner*—Shean C. Wu
(74) *Attorney, Agent, or Firm*—Millen, White, Zelano & Branigan, P.C.

(57) ABSTRACT

The invention relates to a liquid-crystalline medium based on a mixture of polar compounds having negative dielectric anisotropy, characterized in that it comprises one or more compounds of the general formula I

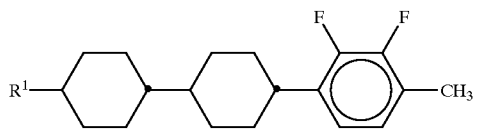

in which $R^1$ is an alkoxy group having up to 12 carbon atoms.

20 Claims, No Drawings

LIQUID-CRYSTALLINE MEDIUM

The present invention relates to a liquid-crystalline medium, to the use thereof for electro-optical purposes and to displays containing this medium, in particular displays having active matrix addressing based on the ECB effect.

The principle of electrically controlled birefringence, the ECB effect or alternatively DAP effect (deformation of aligned phases), was described for the first time in 1971 (M. F. Schieckel and K. Fahrenschon, "Deformation of nematic liquid crystals with vertical orientation in electrical fields", Appl. Phys. Lett. 19 (1971), 3912). This was followed by papers by J. F. Kahn (Appl. Phys. Lett. 20 (1972), 1193) and G. Labrunie and J. Robert (J. Appl. Phys. 44 (1973), 4869)

The papers by J. Robert and F. Clerc (SID 80 Digest Techn. Papers (1980), 30), J. Duchene (Displays 7 (1986), 3) and H. Schad (SID 82 Digest Techn. Papers (1982), 244) have shown that liquid-crystalline phases must have high values for the ratio between the elastic constants $K_3/K_1$, high values for the optical anisotropy $\Delta n$ and values for the dielectric anisotropy $\Delta\varepsilon$ of from about $-0.5$ to about $-5$ in order to be suitable for high-information display elements based on the ECB effect. Electro-optical display elements based on the ECB effect have a homeotropic edge alignment.

Technical use of this effect in electro-optical display elements requires LC phases which must satisfy a multiplicity of requirements. Particularly important here are chemical resistance to moisture, air and physical effects, such as heat, radiation in the infrared, visible and ultraviolet regions and direct and alternating electric fields.

Technically suitable LC phases are furthermore required to have a liquid-crystalline mesophase in a suitable temperature range and low viscosity.

None of the series of compounds having a liquid-crystalline mesophase which have been disclosed hitherto includes a single compound which meets all these requirements. In general, therefore, mixtures of from 2 to 25, preferably from 3 to 18, compounds are prepared in order to obtain substances which can be used as LC phases. However, optimum phases could not be prepared easily in this way, since no liquid-crystalline materials of significantly negative dielectric anisotropy were hitherto available.

Matrix liquid-crystal displays are known. Non-linear elements which can be used for individual switching of the individual pixels are, for example, active elements (i.e. transistors). This is then referred to as an "active matrix", and a distinction can be made between two types:
1. MOS (metal oxide semiconductor) or other diodes on a silicon wafer as substrate.
2. Thin-film transistors (TFTs) on a glass plate as substrate.

The use of single-crystal silicon as substrate material limits the display size, since even modular assembly of various part-displays results in problems at the joints.

In the case of more promising type 2, which is preferred, the electro-optical effect used is usually the TN effect. A distinction is made between two technologies: TFTs comprising compound semiconductors, for example CdSe, or TFTs based on polycrystalline or amorphous silicon. Intensive work is being carried out worldwide on the latter technology.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be expanded to fully colour-compatible displays, in which a mosaic of red, green and blue filters is arranged in such a way that each filter element is located opposite a switchable pixel.

The TFT displays usually operate as TN cells with crossed polarizers in transmission and are backlit.

The term MLC displays here covers any matrix display containing integrated non-linear elements, i.e., besides the active matrix, also displays containing passive elements, such as varistors or diodes (MIM=metal-insulator-metal).

MLC displays of this type are particularly suitable for TV applications (for example pocket TVs) or for high-information displays for computer applications (laptops) and in automobile or aircraft construction. Besides problems regarding the angle dependence of the contrast and the response times, difficulties also arise in MLC displays due to inadequate resistivity of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210–288 Matrix LCD Controlled by Double Stage Diode Rings, p. 141 ff, Paris; STROMER, M., Proc. Eurodisplay 84, September 1984: Design of Thin Film Transistors for Matrix Addressing of Television Liquid Crystal Displays, p. 145 ff, Paris]. With decreasing resistance, the contrast of an MLC display drops, and the problem of after-image elimination can occur. Since the resistivity of the liquid-crystal mixture generally drops over the life of an MLC display owing to interaction with the interior surfaces of the display, a high (initial) resistance is very important for displays which must have acceptable resistance values over a long service life.

It is furthermore important that the resistivity increases as little as possible with increasing temperature and after heating and/or UV exposure. The low-temperature properties of the mixtures of the prior art are also particularly disadvantageous. It is required that crystallization and/or smectic phases do not occur, even at low temperatures, and that the temperature dependence of the viscosity is as low as possible. The MLC displays of the prior art thus do not satisfy today's requirements.

EP 0 474 062 discloses MLC displays based on the ECB effect. However, the LC mixtures described therein, which are based on 2,3-difluorophenyl derivatives containing an ester, ether or ethyl bridge, have low "voltage holding ratio" (HR) values after UV exposure.

There thus continues to be a great demand for MLC displays which have very high resistivity at the same time as a broad operating temperature range, short response times, even at low temperatures, and a low threshold voltage, and which do not have the disadvantages described above, or only do so to a reduced extent.

It is an object of the invention to provide MLC displays based on the ECB effect which do not have the abovementioned disadvantages, or only do so to a lesser extent, and preferably at the same time have very high resistivities and low threshold voltages.

Upon further study of the specification and appended claims, further objects and advantages of this invention will become apparent to those skilled in the art.

It has now been found that objects of the invention can be achieved by using media according to the invention in displays.

The invention thus includes a liquid-crystalline medium based on a mixture of polar compounds having negative dielectric anisotropy, characterized in that it comprises one or more compounds of the general formula I

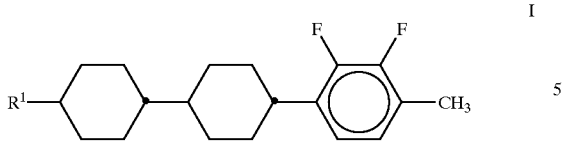

in which $R^1$ is an alkoxy group having up to 12 carbon atoms.

The media according to the invention have very high HR values, low threshold voltages and in particular very good low-temperature stability and at the same time high clearing points.

The threshold voltage ($V_o$) of the media according to the invention typically is in the range from 1.25 to 2.5V, preferably in the range from 1.5 to 2.2 V and most preferably 1.75 to 2.05 V. The clearing point of the inventive media is preferably in the range from 85° C. to 120° C., preferably from 70° C. to 110° C., and most preferably in the range from 80° C. to 101° C.

The HR after 5 minutes at 100° C. is in the range from 95% to 100% preferably 97% or greater most preferably 98% or greater. The media are stable against storage at −30° C. in test cells for preferably more than 500 h more preferably for more than 1000 h.

Some preferred embodiments are mentioned below:

a) A medium which additionally comprises one or more compounds of the formula II:

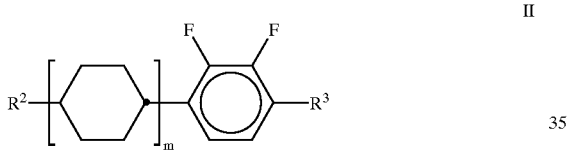

in which
m is 1 or 2 and
$R^2$ and $R^3$ are each, independently of one another, an alkyl or alkenyl group having up to 12 carbon atoms, in which, in addition, one or more non-adjacent $CH_2$ groups may be replaced by —O—, —S— and/or —C≡C—.

b) A medium which additionally comprises one or more compounds of the formula III:

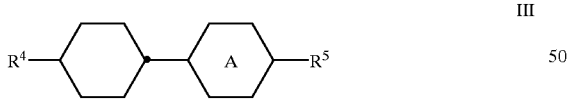

in which ring A is 1,4-trans-cyclohexylene or 1,4-phenylene and $R^4$ and $R^5$ are each, independently of one another, as defined for $R^2$.

c) A medium which additionally comprises one or more compounds of the formula IV:

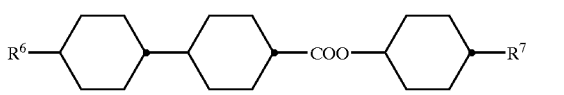

in which $R^6$ and $R^7$ are each, independently of one another, as defined for $R^2$.

d) A medium which comprises one or more compounds selected from the formulae IIa to IIe

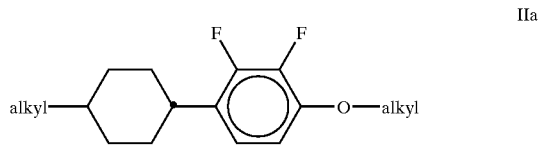

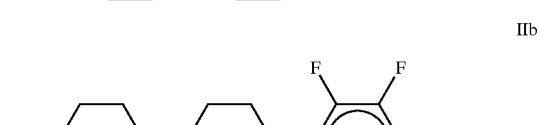

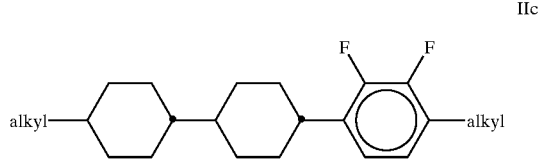

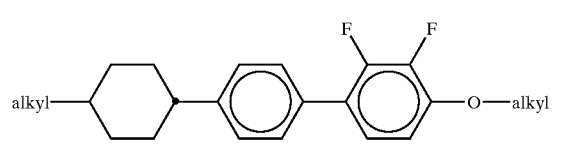

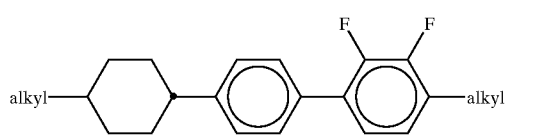

where alkyl is in each case, independently of one another, a straight-chain alkyl group having 1 to 6 carbon atoms.

e) A medium which comprises one or more compounds selected from the formulae IIIa to IIId

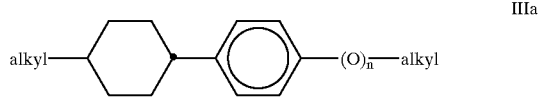

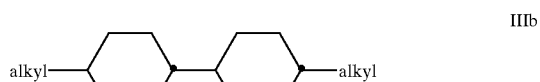

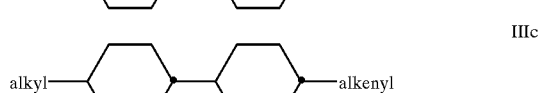

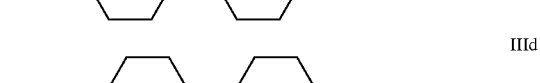

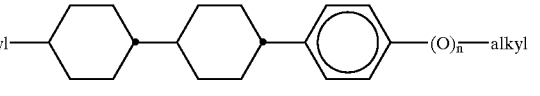

IIIf

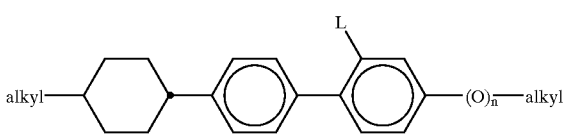

where alkyl is in each case, independently of one another, a straight-chain alkyl group having 1 to 6 carbon atoms, alkenyl is a straight-chain alkenyl group having 2 to 6 carbon atoms, n is 0 or 1 and L is H or F.

f) A medium which essentially consists of 4 or more compounds of the formulae I and II and one or more compounds of the formula III.

g) A medium which comprises at least 2, preferably 2 to 5, compounds of the formula I.

h) A medium which comprises at least 1 compound of the formula IIa, at least one compound of the formula IIb and optionally additionally at least one compound of the formula IIc.

i) A medium which comprises at least one compound of the formula IIIa and/or IIIb and/or III'e.

k) A medium which comprises at least one compound of the formula IIIc and/or IIId.

l) A medium which comprises at least one, preferably 2 to 5, compounds of the formula IV, in which $R^6$ and $R^7$ are each, independently of one another, a straight-chain alkyl group having 1 to 6 carbon atoms.

m) A medium in which the proportion of compounds of the formula I in the total mixture is at least 10% by weight, preferably 10 to 45% by weight, particularly preferably 15 to 35% by weight.

n) A medium in which the proportion of compounds of the formula II in the total mixture is at least 30% by weight, preferably 30 to 85% by weight, particularly preferably 40 to 75% by weight.

o) A medium in which the proportion of compounds of the formula III in the total mixture is at least 5% by weight, preferably 5 to 35% by weight, particularly preferably 7 to 30% by weight.

p) A medium in which the proportion of compounds of the formula IV in the total mixture is at least 3% by weight, preferably 3 to 25% by weight, particularly preferably 5 to 20% by weight.

q) A medium which comprises at least one compound of the formula IIIc and/or IIId in which alkenyl is vinyl, 1E-propenyl, 1E-butenyl, 3E-butenyl or 3E-pentenyl, in particular vinyl or 1E-propenyl.

r) A medium which essentially consists of:
    10–45% by weight of one or more compounds of the formula I,
    30–85% by weight of one or more compounds of the formula II,
    5–35% by weight of one or more compounds of the formula III, and
    0–25% by weight of one or more compounds of the formula IV.

The invention also relates to an electro-optical display having active matrix addressing based on the ECB effect, characterized in that it comprises, as dielectric, a liquid-crystalline medium as described herein.

The liquid-crystal mixture preferably has a nematic phase range of at least 80 K, particularly preferably at least 100 K, and a maximum flow viscosity of 30 mm$^2 \cdot $s$^{-1}$ at 20° C.

The liquid-crystal mixture according to the invention preferably has a dielectric anisotropy $\Delta \epsilon$ of from about −0.5 to −7, in particular from about −3.0 to −6, at 20° C. and 1 kHz.

The birefringence $\Delta n$ in the liquid-crystal mixture is preferably between 0.06 and 0.14, more preferably between 0.07 and 0.12. The dielectric constant $\epsilon_\parallel$ is generally greater than or equal to 3, preferably from 3.2 to 4.5.

The dielectrics may also comprise further additives which are known to the person skilled in the art and are described in the literature. For example, 0–15% of pleochroic dyes can be added, furthermore conductive salts, preferably ethyldimethyldodecylammonium 4-hexoxybenzoate, tetrabutylammonium tetraphenylborate or complex salts of crown ethers (cf., for example, Haller et al., Mol. Cryst. Liq. Cryst., Volume 24, pages 249–258 (1973)) for improving the conductivity, or substances for modifying the dielectric anisotropy, the viscosity and/or the alignment of the nematic phases. Such substances are described, for example, in DE-A 22 09 127, 22 40 864, 23 21 632, 23 38 281, 24 50 088, 26 37 430 and 28 53 728.

The individual components of the formulae I, II, III and IV in the liquid-crystal mixtures according to the invention are either known or their modes of preparation can easily be derived from the prior art by the person skilled in the relevant art, since they are based on standard methods which are described in the literature.

Corresponding compounds of the formulae I and III are described, for example, in EP 0 364 538.

Corresponding compounds of the formula II are described, for example, in EP 0 122 389, DE 26 36 684 and DE 33 21 373.

The term "alkenyl" in the formulae II to IV encompasses straight-chain and branched alkenyl groups having up to 12, preferably 2 to 7, carbon atoms. Preference is given to straight-chain alkenyl groups. Preference is furthermore given to $C_2$–$C_7$-1E-alkenyl, $C_4$–$C_7$-3E-alkenyl, $C_5$–$C_7$-4-alkenyl, $C_6$–$C_7$-5-alkenyl and $C_7$-6-alkenyl, in particular $C_2$–$C_7$-1E-alkenyl, $C_4$–$C_7$-3E-alkenyl and $C_5$–$C_7$-4-alkenyl.

Of these groups, particular preference is given to vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl and 6-heptenyl. Alkenyl groups having up to 5 carbon atoms are particularly preferred.

The nematic liquid-crystal mixtures in the displays according to the invention generally comprise two components A and B, which themselves consist of one or more individual compounds.

Component A has significantly negative dielectric anisotropy and gives the nematic phase a dielectric anisotropy of $\leq -0.3$. It preferably comprises compounds of the formulae I and II.

The proportion of component A is preferably from 50 to 100%, in particular from 60 to 95% by weight.

For component A, one or more individual compounds having a $\Delta \epsilon \leq -0.8$ are preferably selected. The smaller the proportion of component A in the total mixture, the more negative this value must be.

Component B has pronounced nematogeneity and a flow viscosity of not more than 30 mm$^2 \cdot $s$^{-1}$, preferably not more than 25 mm$^2 \cdot $s$^{-1}$, at 20° C.

Particularly preferred individual compounds of component B are extremely low-viscosity nematic liquid crystals having a viscosity of not more than 18 mm$^2 \cdot $s$^{-1}$, preferably not more than 12 mm$^2 \cdot $s$^{-1}$, at 20° C.

Component B has monotropic or enantiotropic nematogeneity, has no smectic phases and can prevent the occurrence of smectic phases in liquid-crystal mixtures down to very low temperatures. If, for example, a smectic liquid-crystal mixture is mixed with various materials of high nematogeneity, the degree of suppression of smectic phases that is achieved can be used to compare the nematogeneity of these materials. Numerous suitable materials are known to the person skilled in the art from the literature. Particular preference is given to compounds of the formula III.

The liquid-crystal mixtures according to the invention preferably comprise from 4 to 25, in particular from 6 to 18, compounds of the formulae I, II, III and IV.

Besides compounds of the formulae I II, III and IV, it is also possible for other constituents to be present, for example in an amount of up to 45% by weight of the total mixture, but preferably up to not more than 35% by weight, in particular up to not more than 10% by weight.

The other constituents are preferably selected from nematic or nematogenic substances, in particular known substances, from the classes consisting of the azoxybenzenes, benzylideneanilines, biphenyls, terphenyls, phenyl or cyclohexyl benzoates, phenyl or cyclohexyl cyclohexanecarboxylates, phenylcyclohexanes, cyclohexylbiphenyls, cyclohexylcyclohexanes, cyclohexylnaphthalenes, 1,4-bis-cyclohexylbiphenyls or cyclohexylpyrimidines, phenyl- or cyclohexyldioxanes, optionally halogenated stilbenes, benzyl phenyl ethers, tolans and substituted cinnamic acids.

The most important compounds which can be used as constituents of liquid-crystal mixtures of this type can be characterized by the formula V $$R^8\text{—L—G—E—}R^9 \qquad V$$

in which

L and E are each a carbocyclic or heterocyclic ring system from the group consisting of 1,4-disubstituted benzene and cyclohexane rings, 4,4'-disubstituted biphenyl, phenylcyclohexane and cyclohexylcyclohexane systems, 2,5-disubstituted pyrimidine and 1,3-dioxane rings, 2,6-disubstituted naphthalene, di- and tetrahydronaphthalene, quinazoline and tetrahydroquinazoline,

| | |
|---|---|
| —CH=CH— | —N(O)=N— |
| —CH—CQ— | —CH=N(O)— |
| —C≡C— | —CH₂—CH₂— |
| —CO—O— | —CH₂—O— |
| —CO—S— | —CH₂—S— |
| —CH=N— | —COO—Phe—COO— | or a C—C single bond,

Q is halogen, preferably chlorine, or CN, and $R^8$ and $R^9$ are each, independently of one another, alkyl, alkoxy, alkanoyloxy or alkoxycarbonyloxy having up to 18, preferably up to 8, carbon atoms, or one of these radicals is alternatively CN, NC, $NO_2$, $CF_3$, F, Cl or Br.

In most of these compounds, $R^8$ and $R^9$ are different from one another, one of these radicals usually being an alkyl or alkoxy group. However, other variants of the proposed substituents are also common. Many such substances or mixtures thereof are commercially available. All these substances can be prepared by methods which are known from the literature.

It will be appreciated by a person skilled in the art that the ECB mixture according to the invention may also comprise compounds in which, for example, H, N, O, Cl or F have been replaced by the corresponding isotopes.

The construction of the liquid-crystal displays according to the invention corresponds to the conventional geometry, as described, for example, in EP-A 0 240 379.

The entire disclosure of all applications, patents and publications, cited above and of corresponding application No. DE No. 19959033.8, filed Dec. 8, 1999 is hereby incorporated by reference.

EXAMPLES

The examples below are intended to illustrate the invention without limiting it. Hereinbefore and hereinafter, percentages are given in per cent by weight unless indicated otherwise; all temperatures are specified in degrees Celsius.

Besides the compounds of the formula I, the liquid-crystal mixtures according to the invention preferably comprise one or more of the compounds mentioned below.

The following abbreviations are used:

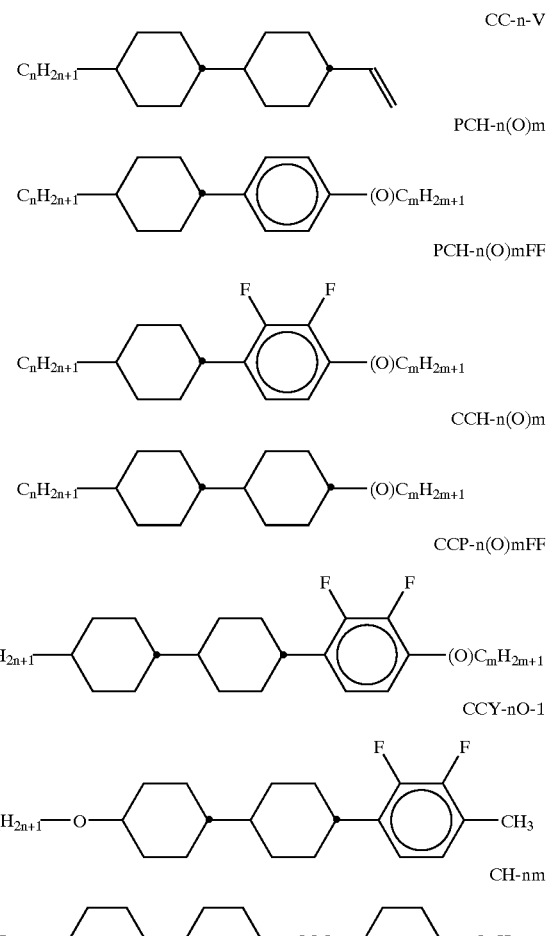

The voltage values $V_0$, $V_{10}$ and $V_{90}$ indicated were measured at 20° C. in a conventional ECB cell having a layer thickness of 5 μm.

The abbreviations furthermore have the following meanings:

S-N crystalline—nematic phase transition [° C.]

cp clearing point [° C.]

Δn optical anisotropy (birefringence) at 20° C. and 589 nm

Δε dielectric anisotropy at 20° C. and 1 kHz $\epsilon_\parallel$ dielectric constant parallel to the longitudinal axis of the molecule at 20° C. and 1 kHz $K_3/K_1$ ratio between the elastic constants $K_3$ and $K_1$ $\gamma_1$ rotational viscosity [mPa·s] (at 20° C., unless indicated otherwise)

$V_0$ voltage [V] at 0% transmission.

The display used to measure the threshold voltage has two plane-parallel outer plates at a separation of 5 μm and electrode layers covered by lecithin alignment layers on the inside of the outer plates, which produce a homeotropic edge alignment of the liquid crystal molecules.

Example 1

A liquid-crystal display comprising

| | | | |
|---|---|---|---|
| CC-5-V | 7.00% | S-N | <−30.0 |
| PCH-304FF | 10.00% | cp. | +102.0 |
| PCH-504FF | 9.00% | Δn | 0.0920 |
| CCP-202FF | 9.00% | Δε | −5.3 |
| CCP-302FF | 9.00% | $\epsilon_\parallel$ | 3.7 |
| CCP-502FF | 9.00% | $K_3/K_1$ | 1.11 |
| CCP-21FF | 11.00% | $V_0$ | 2.03 |
| CCP-31FF | 10.00% | | |
| CCY-2O-1 | 13.00% | | |
| CCY-4O-1 | 13.00% | | |

Example 2

A liquid-crystal display comprising

| | | | |
|---|---|---|---|
| CCH-34 | 6.00% | S-N | <−40.0 |
| CCH-35 | 3.00% | cp. | +91.5 |
| CCH-301 | 9.00% | Δn | 0.0767 |
| CCH-501 | 7.00% | Δε | −4.1 |
| PCH-304FF | 10.00% | $\epsilon_\parallel$ | 3.5 |
| PCH-504FF | 10.00% | $K_3/K_1$ | 0.99 |
| CCP-202FF | 10.00% | $V_0$ | 2.06 |
| CCP-302FF | 10.00% | | |
| CCP-502FF | 9.00% | | |
| CCY-2O-1 | 6.00% | | 2.03 |
| CCY-3O-1 | 4.00% | | |
| CCY-4O-1 | 7.00% | | |
| CH-33 | 3.00% | | |
| CH-35 | 3.00% | | |
| CH-43 | 3.00% | | |

Example 3

A liquid-crystal display comprising

| | | | |
|---|---|---|---|
| PCH-53 | 9.00% | S-N | <−40.0 |
| PCH-304FF | 11.00% | cp. | +91.5 |
| PCH-504FF | 10.00% | Δn | 0.0935 |
| CCP-202FF | 10.00% | Δε | −5.2 |
| CCP-302FF | 10.00% | $\epsilon_\parallel$ | 3.7 |
| CCP-502FF | 10.00% | $K_3/K_1$ | 1.12 |
| CCP-21FF | 10.00% | $V_0$ | 1.98 |
| CCP-31FF | 10.00% | | |
| CCY-2O-1 | 10.00% | | |
| CCY-4O-1 | 10.00% | | |

Example 4

A liquid-crystal display comprising

| | | | |
|---|---|---|---|
| PCH-53 | 10.00% | S-N | <−40.0 |
| PCH-304FF | 14.00% | cp. | +70.5 |
| PCH-502FF | 6.00% | Δn | 0.0883 |
| PCH-504FF | 12.00% | Δε | −5.2 |
| CCP-202FF | 8.00% | $\epsilon_\parallel$ | 4.1 |
| CCP-302FF | 8.00% | $K_3/K_1$ | 1.01 |
| CCP-502FF | 6.00% | $V_0$ | 1.76 |
| CCP-21FF | 7.00% | | |
| CCP-31FF | 7.00% | | |
| CCY-2O-1 | 8.00% | | |
| CCY-3O-1 | 6.00% | | |
| CCY-4O-1 | 8.00% | | |

What is claimed is:

1. A liquid-crystalline medium based on a mixture of polar compounds having negative dielectric anisotropy, which comprises one or more compounds of the formula I

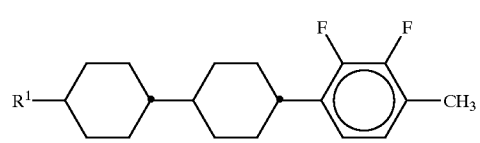

in which $R^1$ is an alkoxy group having 1 to 12 carbon atoms.

2. A medium according to claim 1, which additionally comprises one or more compounds of the formula II

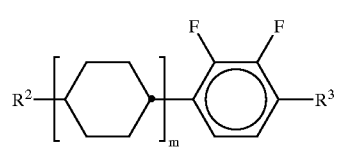

in which m is 1 or 2 and $R^2$ and $R^3$ are each, independently of one another, an alkyl or alkenyl group having 1 to 12 carbon atoms, in which, one or more non-adjacent $CH_2$ groups are optionally replaced by —O—, —S— and/or —C≡C—, provided that when m is 2, $R^2$ is not alkoxy.

3. A medium according to claim 1, which additionally comprises one or more compounds of the formula III

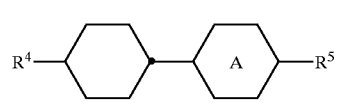

in which ring A is 1,4-trans-cyclohexylene or 1,4-phenylene and $R^4$ and $R^5$ are each, independently of one another, an alkyl or alkenyl group having 1 to 12 carbon atoms, in which, one or more non-adjacent $CH_2$ groups are optionally replaced by —O—, —S— and/or —C≡C—.

4. A medium according to claim 2, which additionally comprises one or more compounds of the formula III

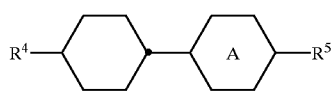
III in which ring A is 1,4-trans-cyclohexylene or 1,4-phenylene and $R^4$ and $R^5$ are each, independently of one another, an alkyl or alkenyl group having 1 to 12 carbon atoms, in which, one or more non-adjacent $CH_2$ groups are optionally replaced by —O—, —S— and/or —C≡C—.

5. A medium according to claim 1, which additionally comprises one or more compounds of the formula IV

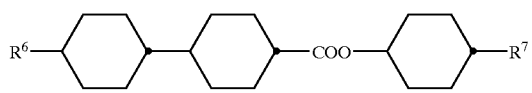
IV in which $R^6$ and $R^7$ are each, independently of one another, an alkyl or alkenyl group having 1 to 12 carbon atoms, in which, one or more non-adjacent $CH_2$ groups are optionally replaced by —O—, —S— and/or —C≡C—.

6. A medium according to claim 1, which additionally comprises one or more compounds selected from the formulae IIa to IIe:

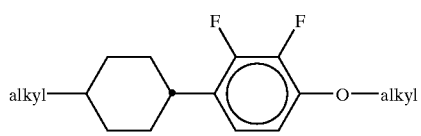
IIa

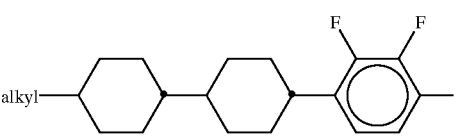
IIb

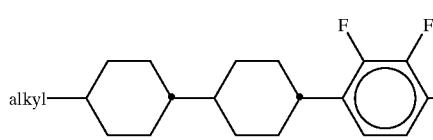
IIc

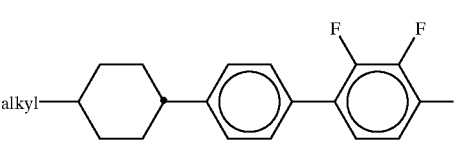
IId

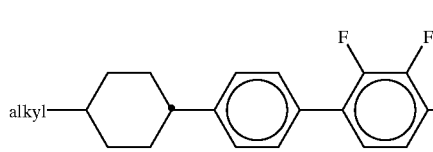
IIe where alkyl is in each case, independently of one another, a straight-chain alkyl group having 1 to 6 carbon atoms.

7. A medium according to claim 1, which additionally comprises one or more compounds selected from those of the formulae IIIa to IIIf:

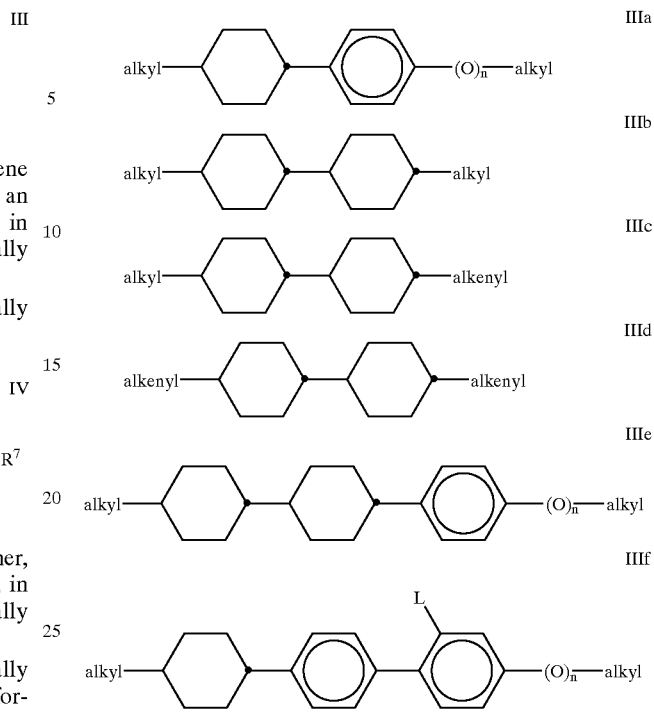

where alkyl is in each case, independently of one another, a straight-chain alkyl group having 1 to 6 carbon atoms, alkenyl is a straight-chain alkenyl group having 2 to 6 carbon atoms, n is 0 or 1 and L is H or F.

8. A medium according to claim 4, which consists essentially of 4 or more compounds of the formulae I and II and one or more compounds of the formula III.

9. A medium according to claim 1, wherein the proportion of compounds of the formula I in the total mixture is at least 10% by weight.

10. A medium according to claim 2, wherein the proportion of compounds of the formula II in the total mixture is at least 30% by weight.

11. A medium according to claim 3, wherein the proportion of compounds of the formula III in the total mixture is at least 5% by weight.

12. A medium according to claim 4, wherein the proportion of compounds of the formula III in the total mixture is at least 5% by weight.

13. A medium according to claim 4, which additionally comprises one or more compounds of the formula IV

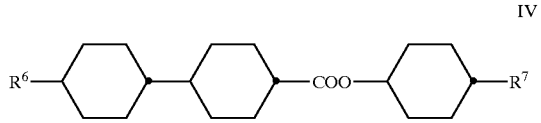
IV in which $R^6$ and $R^7$ are each, independently of one another, an alkyl or alkenyl group having 1 to 12 carbon atoms, in which, one or more non-adjacent $CH_2$ groups are optionally replaced by —O—, —S— and/or —C≡C—.

14. A medium according to claim 13, which consists essentially of
   10–45% by weight of one or more compounds of the formula I,
   30–85% by weight of one or more compounds of the formula II, 5–35% by weight of one or more compounds of the formula III, and from more than 0 to 25% by weight of one or more compounds of the formula IV.

15. An electro-optical display having active matrix addressing based on the ECB effect, which comprises, as dielectric, a liquid-crystalline medium according to claim 1.

16. An electro-optical display having active matrix addressing based on the ECB effect, which comprises, as dielectric, a liquid-crystalline medium according to claim 14.

17. A medium according to claim 13, which consists essentially of

10–45% by weight of one or more compounds of the formula I,

30–85% by weight of one or more compounds of the formula II,

5–35% by weight of one or more compounds of the formula III, and 3 to 25% by weight of one or more compounds of the formula IV.

18. A medium according to claim 4, which consists essentially of

10–45% by weight of one or more compounds of the formula I,

30–85% by weight of one or more compounds of the formula II, and

5–35% by weight of one or more compounds of the formula III.

19. A medium according to claim 13, which consists essentially of

15–35% by weight of one or more compounds of the formula I,

40–75% by weight of one or more compounds of the formula II,

7–30% by weight of one or more compounds of the formula III, and 5 to 20% by weight of one or more compounds of the formula IV.

20. A medium according to claim 1, which comprises 15–35% by weight of one or more compounds of the formula I.

* * * * *